May 19, 1959     R. P. MacKENZIE     2,887,522
STORAGE BATTERY AND METHOD OF MAKING SAME
Filed Jan. 18, 1957

```
┌─────────────────────────────────────────────────┐
│ Assemble cell groups with paper separators       │
│ treated with wetting agent.                      │
└─────────────────────────────────────────────────┘
                      ↓
┌─────────────────────────────────────────────────┐
│ Immerse cell groups in acid electrolyte.         │
└─────────────────────────────────────────────────┘
                      ↓
┌─────────────────────────────────────────────────┐
│ Charge and form the cell groups.                 │
└─────────────────────────────────────────────────┘
                      ↓
┌─────────────────────────────────────────────────┐
│ Dump acid electrolyte.                           │
└─────────────────────────────────────────────────┘
                      ↓
┌─────────────────────────────────────────────────┐
│ Wash cell groups free of acid electrolyte.       │
└─────────────────────────────────────────────────┘
                      ↓
┌─────────────────────────────────────────────────┐
│ Treat cell groups with wetting agent for         │
│ improving wetability of separators.              │
└─────────────────────────────────────────────────┘
                      ↓
┌─────────────────────────────────────────────────┐
│ Dry and permanize cell groups.                   │
└─────────────────────────────────────────────────┘
```

INVENTOR.
Robert P. Mac Kenzie
BY
Attorney

United States Patent Office 2,887,522
Patented May 19, 1959

2,887,522

STORAGE BATTERY AND METHOD OF MAKING SAME

Robert P. MacKenzie, Muncie, Ind., assignor to General Motors Corporation, Detroit, Mich., a corporation of Delaware Application January 18, 1957, Serial No. 634,930

3 Claims. (Cl. 136—33)

This invention relates to storage batteries and is particularly concerned with dry-charged storage batteries which utilize paper and plastic separators.

In recent years, the use of dry-charged storage batteries has become an important replacement item. These batteries are fully charged at the source of manufacture and are shipped dry to dealers where they may be stored and subsequently placed in active use by merely filling the battery with an acid electrolyte. These dry-charged batteries have been previously charged and formed at the source of manufacture and are, therefore, in readiness for use by the mere addition of the battery acid.

A great majority of dry-charged batteries on the market today utilize micro-porous rubber separators, which separators do not advance any problem in the use of the battery. However, when paper separators or plastic separators are used, several problems occur which heretofore have reduced the usefulness of such separators in dry-charged batteries. These difficulties deal, in the main, with the wetability of the separators which increases the time for the battery to become operative after the electrolyte has been added thereto.

It is, therefore, one of the objects to provide a method for making dry-charged storage batteries including paper or plastic separators therein wherein the separators, after having passed through the charging, forming and washing steps are treated with a wetting agent and are subsequently dried in the cell group.

Another object of the invention is to assemble treated paper or plastic separators with negative and positive plates to form a cell group, immerse the cell group in an acid electrolyte, pass an electric current through the cell groups for charging and forming the same, remove the electrolyte and wash the cell groups, treat the cell groups with a wetting agent, dry the cell groups under elevated temperature conditions and, finally, assemble the cell groups in a battery case for building a dry-charged battery which may be subsequently made fully effective by the mere addition of electrolyte thereto.

Further objects and advantages of the present invention will be apparent from the following description, reference being had to the acompanying drawing wherein preferred embodiments of the present invention are clearly shown.

In the drawing:

The single figure is a flow chart in the basic steps of the process of manufacture.

One form of dry-charged battery is manufactured by the method and apparatus disclosed in Daily et al. Patent 2,528,266. In this method, the positive and negative plates, together with the separators, are assembled into cell groups and, after charging and forming, are ready for insertion in a battery case. In order to charge and form such cell groups, the assemblies are placed in buckets or containers in the apparatus disclosed in the aforementioned patent and are connected in series. Electrolyte is then added to the containers and the series-connected cell groups are connected to a source of electrical current sufficient to ultimately charge and form the groups. The several containers are carried by a conveyor so that the cell groups, as they pass through the apparatus over an extended and controlled period of time, are fully formed and charged and, finally, the battery acid is dumped from the containers and the cell groups are thoroughly washed with water, are subsequently dried and are then placed in battery boxes or containers and are sealed therein. In this manner, a dry-charged battery is manufactured and is ready for use when acid is added at a subsequent time. As previously stated, in this instance, the separators used have been micro-porous rubber separators.

When paper separators, which are a high-grade cellulose paper impregnated with a resin such as a phenol-formaldehyde, are used or when plastic separators such as porous polystyrene separators are used, the material of the separator does not have an affinity for water and it is difficult to wet the separator with the battery acid. Thus, when cell group assemblies are used in the Daily apparatus wherein either paper or plastic separators are provided, it was found necessary to treat the separators with a wetting agent before the acid was added in the process. Thereafter, when the acid electrolyte is added to the conveyor containers, which carry the several cell groups, the battery acid quickly wets through the separators and the cell groups are ready for charging and formation.

After the cell groups had been charged, formed, washed and dried and finally assembled in a battery, it was found that the battery, in its dry-charged state, was not fully efficient upon the addition of electrolyte thereto when the battery was to be used in the field. This reduction in efficiency was traced directly to the low wetability factor of the separators which prevented the electrolyte from passing therethrough until several hours had elapsed whereby the battery did not develop full voltage for several hours.

In order to overcome this difficulty and make the battery immediately effective upon addition of electrolyte thereto, it was found that, after the washing of the charged cell groups, that the groups should again be treated with a wetting agent solution prior to the "permanizing" or drying step. This step preferably occurs under substantially non-oxidizing conditions such as in an incompletely burned natural gas atmosphere wherein the oxygen and moisture content is controlled and kept reasonably low and the temperature ranges up to 250° F. for about an hour. The dried and permanized cell groups, when removed from the permanizer, include a coating of wetting agent thereover which assures full efficiency of the battery as soon as electrolyte is added thereto in the field.

Specifically, the wetting agent used in the first wetting step may be any satisfactory wetting agent which is innocuous to the chemical action in the battery and which may be, for example, dioctyl sodium sulfo-succinate known as "Aerosol" or, in general, sulfonated esters of dicarboxylic acids; sulphated fatty alcohols known as "Duponols"; polypropylene glycols having a molecular weight of at least 1250; products of condensation of ethylene oxide and polyoxypropylene bases; trimethyl nonyl ether of polyethylene glycols; "Nekal," which is sodium isopropyl, naphthalene sulphonate, etc., or other known wetting agents that will suitably wet the separator to facilitate the dispersion of the electrolyte through the separators without affecting the chemical or electrical properties of the battery.

The wetting agent used in the second wetting step must be chosen with greater care since this wetting agent must be one capable of passing through the permanizing apparatus wherein it is heated to a temperature in the order of 250° F. for one hour and, obviously, any material which is deleteriously affected by heat will not be satisfactory. In general, this wetting agent must be stable in battery acid for a sufficient time to permit its function to be complete, it must be non-foaming and easily water soluble and it must be heat stable within the temperature range noted. Specifically, we have found that trimethyl nonyl ether of polyethylene glycol meets all of these requirements admirably and is entirely satisfactory to use in this application. However, it is again understood that any other wetting agent which will meet the requirements set forth may be substituted and, in this connection, since there are other wetting agents well known in the art and wherein the specific properties thereof are also well known, it is understood that such wetting agents are comprehended for the present use.

In both cases, the wetting agent is preferably added in water solution and is present in quantities of from ½% to 5% by weight with 1% being preferred. In this case, the amount of wetting agent used is limited only by the result. Therefore, the wetting agent should be present in quantities sufficient to provide the desired effect without having any deleterious action upon the elements of the battery or its operation.

The first addition of the wetting agent may be made directly to the resin impregnant, if desired, rather than wetting the separator after curing as is well known in the art or the first step wetting agent may be included in the acid used during the charging and forming operation.

It is also pointed out that the use of the second step wetting agent, i.e., after charging and forming and before drying of the cell groups, not only increases the wetability of the separators but improves the wetability of the positive and negative plates to make the dry charged battery immediately effective upon addition of battery acid thereto.

Paper separators of the type described herein are set forth in more detail in copending application, S.N. 628,166, assigned to the assignee of the present invention and filed Dec. 13, 1956. In place of a phenolic resin as an impregnant for the paper, any other acid resistant material may be used which provides satisfactory electrical and chemical properties to the separator, for example, a polymerized furfuryl alcohol, phenol-furfural resin, melamine-formaldehyde resin, etc. Plastic separators of several types are disclosed in U.S. Patent #2,729,694. In both instances, it is understood that either paper or plastic separators of other components which have a low degree of wetability with respect to the battery acid will require the same type of treatment to eliminate the difficulties and, therefore, it is understood that this invention is directed, in the broad sense, to operations on assemblies which include either paper or plastic separators and which have been processed as disclosed.

While the embodiments of the present invention as herein disclosed constitute preferred forms, it is to be understood that other forms might be adopted.

What is claimed is as follows:

1. In a method for making dry charged storage batteries, the steps comprising; assembling cell groups including negative and positive plates separated by separators taken from the class consisting of paper and plastics which separators have been previously treated with a wetting agent, charging and forming the cell groups in battery acid, removing the battery acid from the cell groups, washing the cell groups free from acid, treating the wet, charged and formed cell groups with a wetting agent that is not deleteriously affected by the heat of the subsequent drying step, drying the cell groups under controlled conditions of temperature and in a substantially nonoxidizing atmosphere, and finally assembling the dried and charged cell groups in battery cases whereby fully charged, ready-to-use batteries are available upon subsequent addition of battery acid thereto.

2. In a method for making a dry-charged storage battery including paper separators, the steps comprising, assembling cell groups including paper separators, charging and forming the cell groups in battery acid, dumping the acid from the cell groups and washing the cell groups free from acid, treating at least the paper separators with trimethyl nonyl ether of polyethylene glycol, drying the cell groups and finally assembling the dried cell groups in battery cases for forming the finished dry-charged battery whereby a fully charged, ready to use battery is available upon the subsequent addition of battery acid thereto.

3. In a method for making a dry-charged storage battery including paper separators, the steps comprising, assembling cell groups including separators taken from the class consisting of paper and plastic, charging and forming the cell groups in battery acid, dumping the acid from the cell groups and washing the cell groups free from acid, dipping the cell groups in a solution of trimethyl nonyl ether of polyethylene glycol, drying the cell groups and finally assembling the dried cell groups in battery cases for forming the finished dry-charged battery whereby a fully charged, ready to use battery is available upon the subsequent addition of battery acid thereto.

References Cited in the file of this patent

UNITED STATES PATENTS

| 1,478,708 | Gasche | Dec. 25, 1923 |
| 1,478,786 | Hazelett | Dec. 25, 1923 |
| 2,662,032 | Uhlig et al. | Dec. 8, 1953 |
| 2,662,107 | Uhlig et al. | Dec. 8, 1953 |

FOREIGN PATENTS

| 383,201 | Great Britain | Nov. 10, 1932 |

OTHER REFERENCES

G. W. Vinal: "Storage Batteries," John Wiley and Sons, New York, 1955, Ed. 4, page 41. (Call No. QC 605V54, 1955.)